(12) United States Patent
Jia et al.

(10) Patent No.: US 9,451,066 B1
(45) Date of Patent: Sep. 20, 2016

(54) APPARATUS FOR CREATING CUSTOM ARTWORK ON CELL PHONE PROTECTOR CASES

(71) Applicants: Jun Jia, Guangdong (CN); Lihui Zhang, Guangdong (CN)

(72) Inventors: Jun Jia, Guangdong (CN); Lihui Zhang, Guangdong (CN)

(73) Assignee: Valor Communication, Inc., City of Industry, CA (US)

( * ) Notice: Subject to any disclaimer, the term of this patent is extended or adjusted under 35 U.S.C. 154(b) by 185 days.

(21) Appl. No.: 14/288,603

(22) Filed: May 28, 2014

(51) Int. Cl.
*H04M 1/02* (2006.01)
*H04B 1/3888* (2015.01)

(52) U.S. Cl.
CPC .......... *H04M 1/0283* (2013.01); *H04B 1/3888* (2013.01)

(58) Field of Classification Search
CPC ................ H04M 1/0283; Y10T 428/1486; H04B 1/3888
See application file for complete search history.

(56) References Cited

U.S. PATENT DOCUMENTS

| 6,910,718 | B2 | 6/2005 | Chareas et al. |
| 7,206,618 | B2 | 4/2007 | Latto et al. |
| 8,110,268 | B2 | 2/2012 | Hegemier et al. |
| 8,261,195 | B2 | 9/2012 | Buehler et al. |
| 8,676,281 | B1 * | 3/2014 | Caulder .............. H04M 1/0283 455/575.1 |
| 2006/0023872 | A1 | 2/2006 | Chang |
| 2006/0040081 | A1 | 2/2006 | Hodsdon et al. |
| 2006/0188668 | A1 | 8/2006 | Wahba |

FOREIGN PATENT DOCUMENTS

CN 2629358 Y 7/2004

* cited by examiner

*Primary Examiner* — Nam Huynh
(74) *Attorney, Agent, or Firm* — Thomas I. Rozsa

(57) ABSTRACT

An apparatus to create decorative artwork on the back of a cell phone protector case including a cell phone protector case having at least a partially transparent back wall with a partially transparent interior surface, a decorative inset card with a decorative image thereon and one or more colored rhinestones which are affixed on the back of the cell phone protector case at the location where the multicolored image is shown through so that the color of the rhinestone matches the color of the image on the decorative insert card which shows through the transparent back wall and transparent interior wall.

3 Claims, 6 Drawing Sheets

APPARATUS FOR CREATING CUSTOM ARTWORK ON CELL PHONE PROTECTOR CASES

BACKGROUND OF THE INVENTION

1. Field of the Invention

The present invention relates to the field of creating custom artwork on cell phone protector cases to encourage individuals to decorate the cell phone by an exterior decoration of the cell phone protector case which encourages the enjoyment of the use of the cell phone protector case.

2. Description of the Prior Art

The following eight patents and published patent applications are the closest prior art which are related to the present invention but do not disclose the present invention. In all of the prior art as identified below, the decoration is on the interior of the cell phone protector case and usually involves either painting or creating some other artwork that is within the cell phone protector case where the cell phone protector case has a clear back wall so that the artwork can be viewed. All of the prior art set forth below does not involve utilizing a creative apparatus to produce a very decorative piece of artwork on the exterior of the back of a cell phone protector case.

1. U.S. Pat. No. 6,910,718 issued to Nick Chareas et al. on Jun. 28, 2005 for "Writing Pad For Cellphone".
2. United States Published Patent Application No. 2006/0023872 to Richard Chang on Feb. 2, 2006 for "Portable Electronic Device Customization Kit".
3. United States Published Patent Application No. 2006/0040081 to Jerry Grant Hodsdon et al. on Feb. 23, 2006 for "Apparatus, System, And Method For Personalizing A Portable Electronic Device".
4. United States Published Patent Application No. 2006/0188668 to Sol Wahba on Aug. 24, 2006 for "Decorative Attachment For Personal Property".
5. U.S. Pat. No. 7,206,618 issued to Antonio T. Latto et al. on Apr. 17, 2007 for "Removable Customizable Inserts And Faceplate For Electronic Device".
6. U.S. Pat. No. 8,110,268 issued to Darrin G. Gegemier on Feb. 7, 2012 for "Adhesive Cover For Consumer Devices".
7. U.S. Pat. No. 8,261,195 issued to Doyle Buehler et al. on Sep. 4, 2012 for "Method For Customizing A Cover For Electronic Device".
8. Chinese Patent No. CN2629358Y issued to Wang Kaiyi on Jul. 28, 2004 for "Cultural Mobile Phone".

SUMMARY OF THE INVENTION

The present invention is an apparatus to enable an individual to create a very decorative piece of artwork on the exterior of the cell phone protector case so that the cell phone protector case will be a fashion accessory for an individual which will further enable them to enjoy the cell phone as well as showing off the creative artwork that they prepared using rhinestones on the exterior of the cell phone protector case.

In one operative embodiment, the artwork for creating decorative custom artwork on cell phone protector cases includes the following:

1. A clear case which has at least a clear back wall;
2. Templates which are designed to fit precisely within the back of the cell phone protector cases including any cutouts to accommodate operative components such as a camera or microphone;
3. A multiplicity of different colored rhinestones;
4. A rhinestone dispenser to enable the rhinestones to be picked and placed on the exterior of the cell phone protector case;
5. A stone picking apparatus;
6. An adhesive to retain the rhinestones onto the back of the cell phone protector case such as glue and plastic tweezers by which the rhinestones can be picked out of the rhinestone case and placed onto the back of the cell phone protector case after adhesive has been applied.

It is an object of the present invention to enable an individual to create memorable and useable cases that have a very decorative rhinestone artwork pattern on the exterior of the cell phone protector case so that the individual can show off their new decorative artwork on their cell phone protector cases to their friends, and create such a decorative artwork cell phone protector case to give as a gift to a friend or to create a collection of different cell phone protector cases having different artwork on the back as a collection so that they can be displayed, or alternatively, used at different times for special occasions.

Since small rhinestones are used along with adhesive, this is not a children's toy and it is recommended that only persons over the age of fifteen (15) years be provided access to the commercial embodiment of this invention.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF EMBODIMENTS OF THE PRESENT INVENTION

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
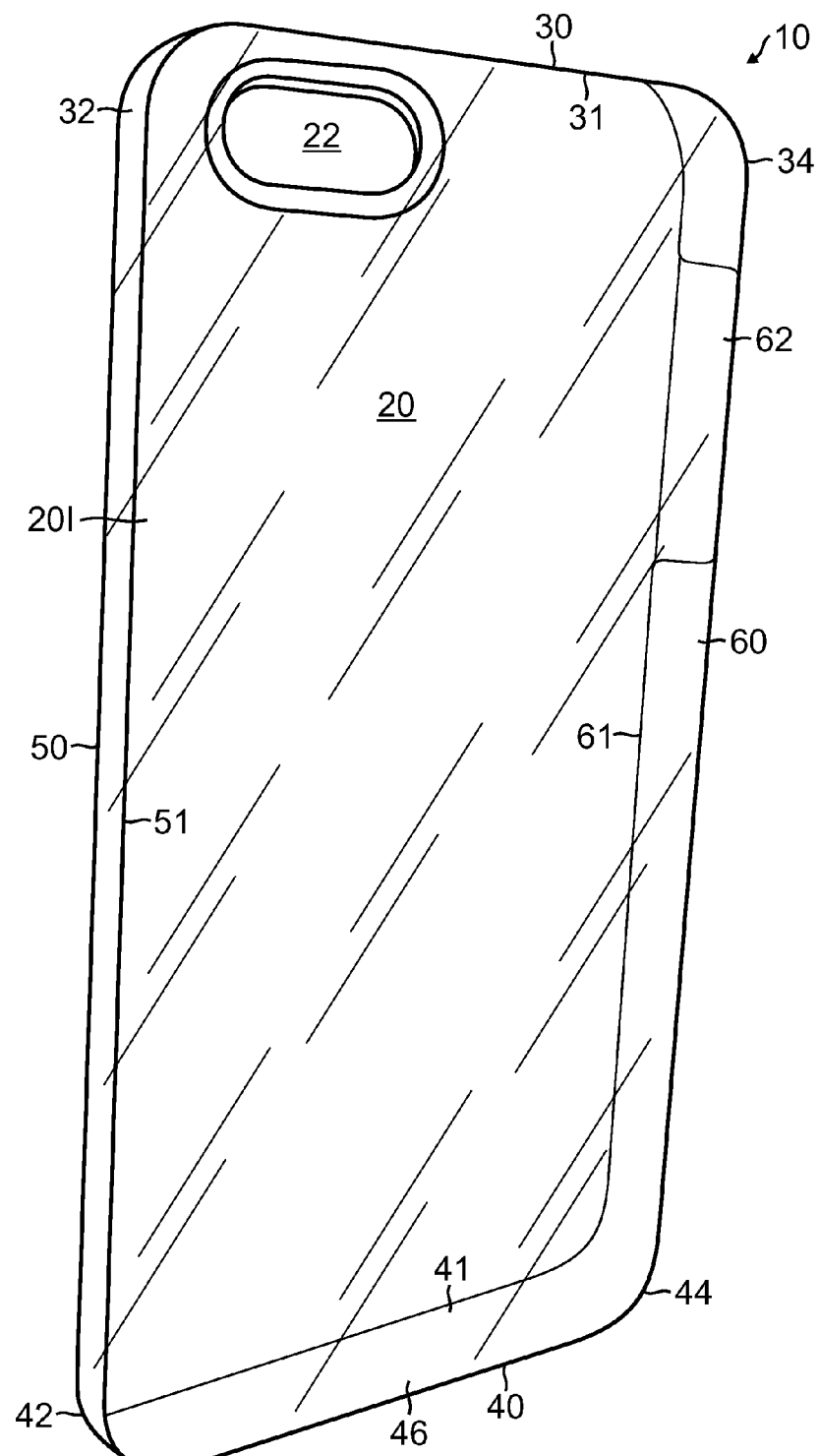
FIG. 1 is a rear perspective view of a cell phone protector case having at least a transparent rear surface for purposes of the present invention.

FIG. 1 is a perspective view of a transparent cell phone protector case which is used with the present invention. The cell phone protector case 10 has a back wall 20, a top wall 30, a bottom wall 40, a first side wall 50 and a second side wall 60 with the top wall 30, and the first side wall 50 flowing together at a corner 32, and the top wall 30 and the second side wall 60 flowing together at a corner 34, and the bottom wall 40 and the side wall 50 flowing together at a corner 42, and the bottom wall 50 and the side wall 60 flowing together at a corner 44 so that the entire cell phone protector case 10 is formed in one piece. Different openings are also created in sections of the cell phone protector case to accommodate functional features of a cell phone retained therein. Specifically, back wall 20 contains an opening 22 which can accommodate a feature such as a camera of a cell phone. Side wall 60 has an opening 62 to accommodate operative buttons or other features of a cell phone, bottom wall 40 has an opening 46 to accommodate features such as a charging unit of a cell phone. It is within the spirit and scope of the present invention for all or any portion of the walls 20, 30, 40, 50, 60, 32, 34, 42 and 44 to be transparent, however, at a minimum, the rear wall 20 must be at least partially transparent so that an image on an insert card press fit retained against an at least partially transparent interior surface 20I of the back wall 20 is visible.

Figure 2:
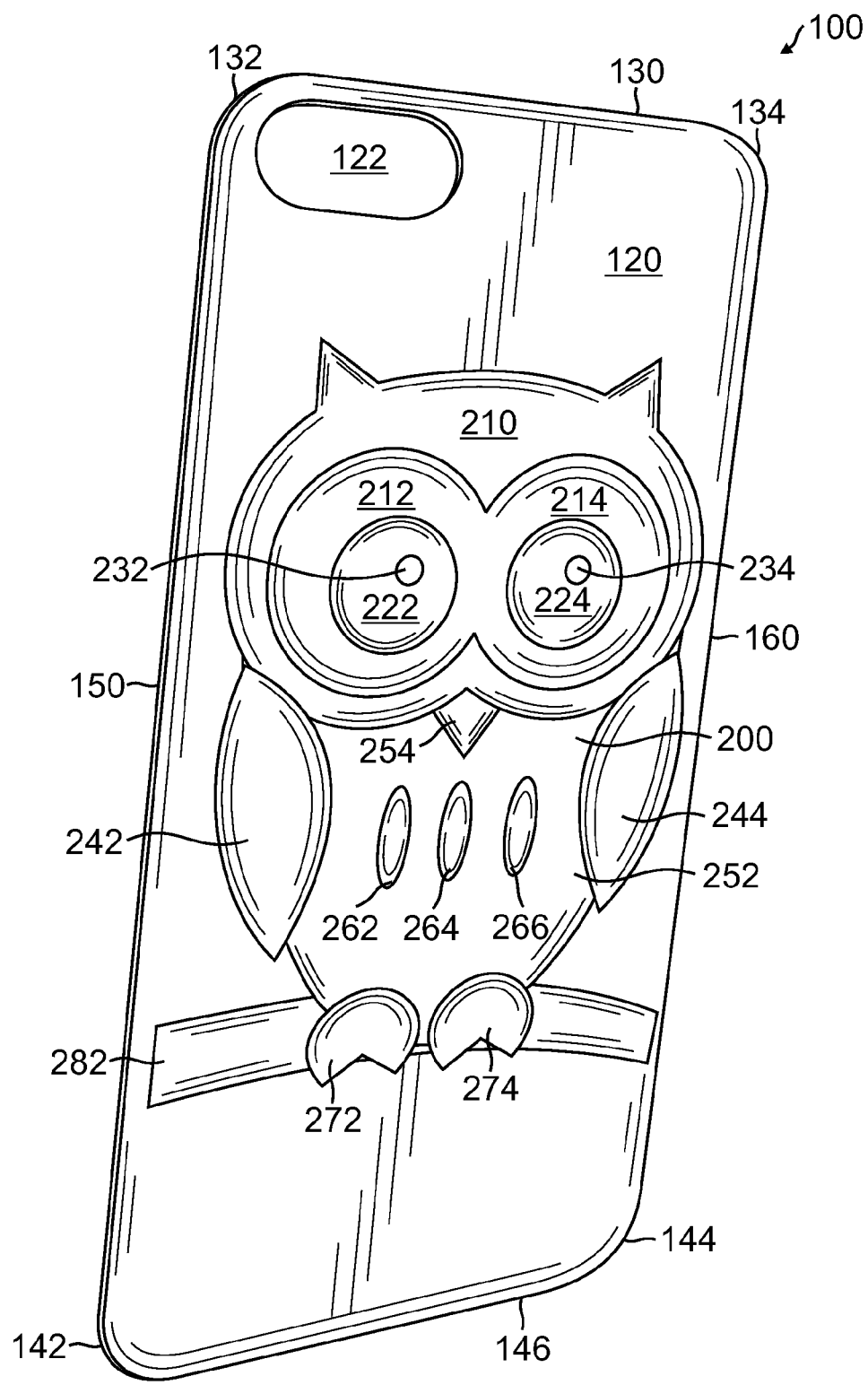
FIG. 2 is a front perspective view of one decorative insert template having a decorative artwork such as an owl on the insert template. The insert template is sized to be press fit within the back of the cell phone protector case so that the artwork appears through the transparent back of the cell phone protector case.
Figure 3:
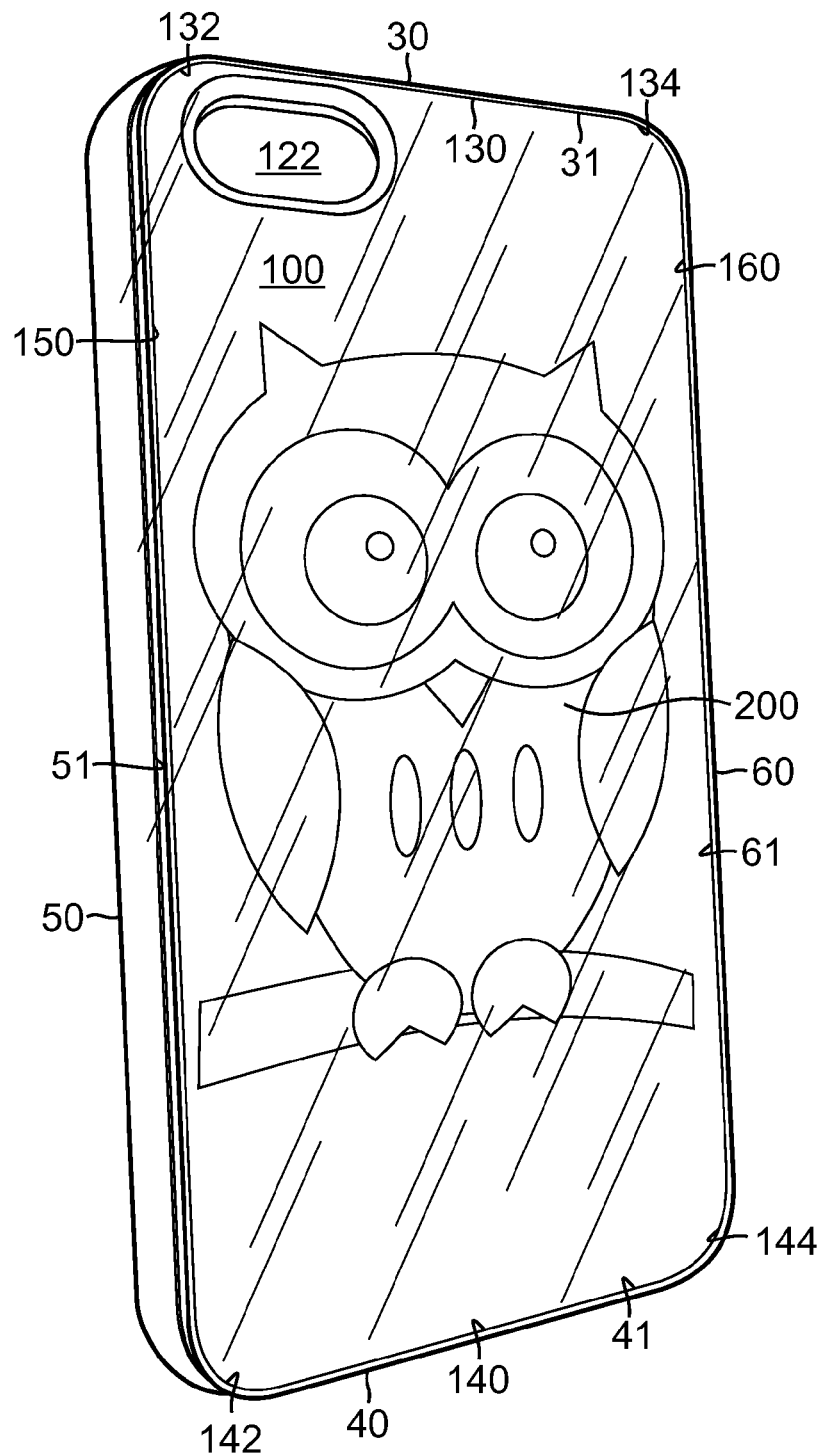
FIG. 3 is a front perspective view of the decorative insert illustrated in FIG. 2 inserted and press fit into the transparent cell phone protector case so that the decorative insert with the artwork thereon is clearly visible through the transparent back of the cell phone protector case.

Referring to FIG. 2, there is one example of a decorative insert card which contains thereon artwork which is utilized with the present invention. The decorative insert card 100 has an upper surface 130, a lower surface 146, a first side wall 150, a second side wall 160, an opening 122 to match the opening 22 in the cell phone protector case 10. The upper surface 130 and the first sidewall 150 flow together at a first corner 132. The upper surface 130 and the second sidewall 160 flow together at a second corner 134. The lower surface 146 and the first sidewall 154 flow together to form a third corner 142. The bottom surface 146 and the second sidewall 160 flow together to form a fourth corner 144. Printed onto the insert card 100 is a decorative artwork 200 which in the case of the illustration is an owl. It will be appreciated that the decorative artwork 200 on the insert card 100 can be any decorative item which would be attractive to the taste of different target audiences over the age of fifteen (15) years.

By way of example, and not limitation, the decorative artwork can be a bird, any type of decorative artwork that matches another animal such as a lion, tiger, leopard, jaguar, bear, etc. and any type of decorative artwork that matches a celestial body such as a sun, moon, stars, etc. Also, to give the user guidance as to what type of color should be affixed onto the back wall of the cell phone protector case from the rhinestones, the artwork 200 can have different colors so that a matching color rhinestone can be placed on the back wall at the location where the color appear from the insert card 100 through the back wall 20 of the cell phone protector case 10. By way of example only, the owl artwork 200 can have an upper section 210 which covers the owl's head, a pair of ears, and the owl's face below the owl's eyes which, by way of example only, can be the color red. The decorative artwork also has a pair of owl's eye sockets 212 and 214 which can be the color white. Within the decorative eye sockets are eyes 222 and 224 which can be a color black to set it apart from the white of the eyeballs and then pupils 232 and 234 respectively set within the eyes 222 and 224. The owl's wings 242 and 244 can be green. The owl's body 252 can be blue. The owl's beak 254 can be yellow. Portions of the owl's feathers such as 262, 264 and 266 can be red. The owl's feat 272 and 274 can be yellow and the owl can be shown seated on a branch 282 which can be the color black.

It will be appreciated that all of these colors are simply one selection of colors that can be placed on the artwork 200 of the decorative insert and the present invention permits the individual to draw their own artwork on the card or alternatively, to use the preselected cards that come within the kit which contain any decorative animal with a different series of colors to distinguish one part of the animal from the other or one part of a celestial body from another so that it is easy to place matching colored rhinestones at the location where the color is found on the specific decorative artwork of the insert.

It will be appreciated that the dimensions of the entire decorative artwork shown in FIG. 1 are just slightly smaller than the rear of the cell phone protector case and the upper wall, lower wall, first side wall and second side wall so that the decorative insert 100 is press fit retained against the interior surface 20I of rear wall 20 of the cell phone protector case and press fit retained against the interior of the walls of the cell phone protector case. The cell phone protector case has an upper surface 30 with an interior wall 31, a lower surface 40 with an interior surface 41, a first side wall 50 with an interior surface 51, and a second side wall 60 with an interior surface 61. The insert 100 is sized to be exactly press fit retained against the interior surface 20I of back wall 20 of the cell phone protector case 10 so that its top wall 120 is press fit against the interior wall 31 of top wall 30 of the cell phone protector case 10, its bottom wall 140 is press fit against the interior 41 of the bottom wall 40 of the cell phone protector case 10, its first side wall 150 is press fit against the interior 51 of the first side wall 50 of the cell phone protector case 10 and its side wall 160 is press fit against the interior 61 of the second side wall 60 of the cell phone protector case 10 so that the decorative insert 100 is firmly affixed within the cell phone protector case 10 and will not move as the artwork is being applied to the back wall 20 of the cell phone protector case 10.

Figure 4:
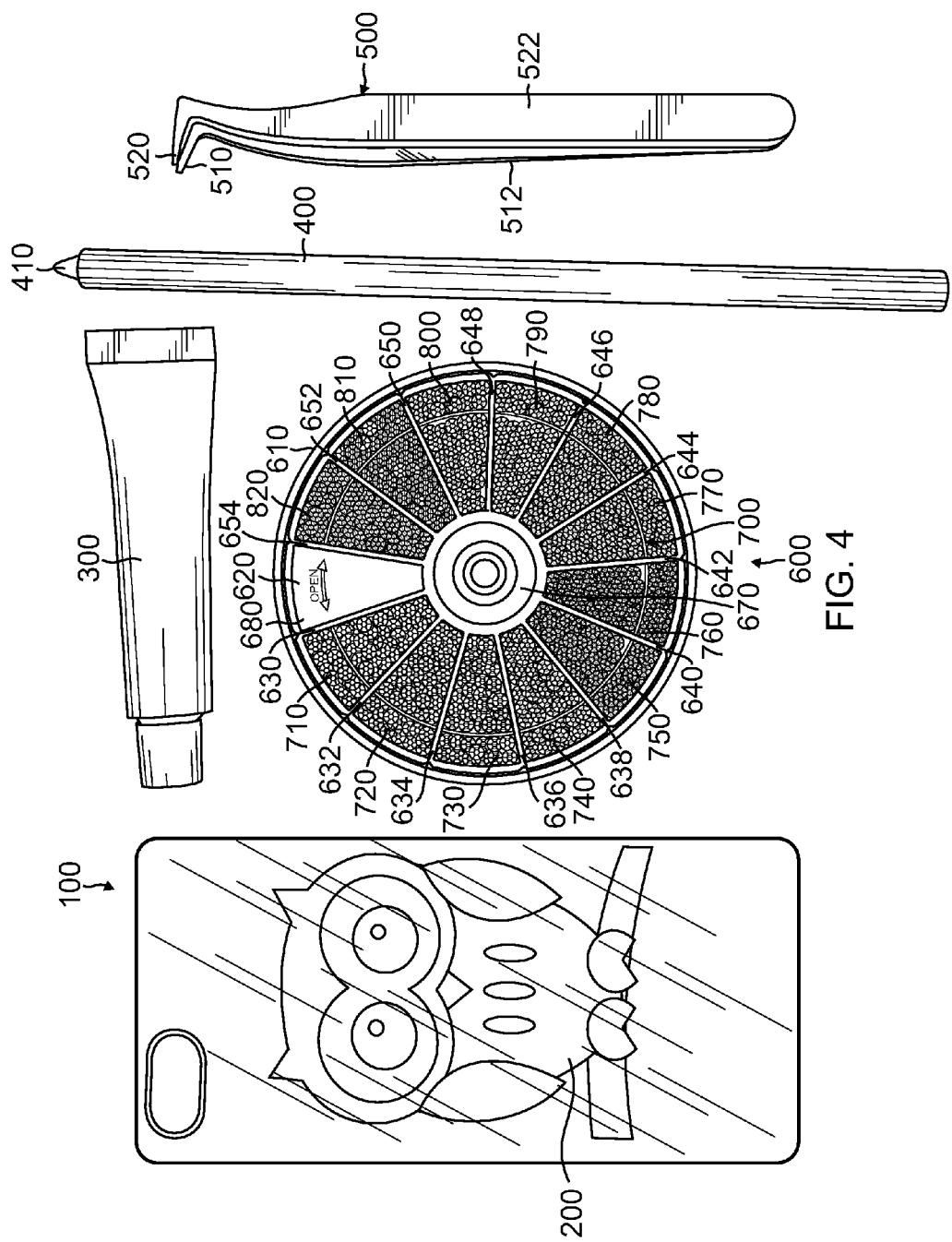
FIG. 4 is a perspective view of the kit used to create the decorative rhinestone artwork on the back of the cell phone protector case including the one sample insert, a tube containing an adhesive such as glue, a case containing a multiplicity of different colored rhinestones in a circular pattern with each one color separated from an adjacent color by an interior boundary within the container, the case made of transparent material so that the different colored rhinestones are visible and once the top is removed, the different colored rhinestones are accessible, an apparatus to select a specific color rhinestone, remove it from the rhinestone retainer and place it onto the cell phone case at a location corresponding to a portion of the decorative insert which can be seen through the back of the transparent case.

Referring to FIG. 4, there are components of the kit of the present invention which includes a decorative insert card 100, a tube 300 which contains adhesive 310 such as glue, a rhinestone placement apparatus such as a rhinestone placement pencil 400 with a placement tip 410, a rhinestone pickup-up apparatus such as a pair of tweezers 500 which includes a first handle 512 terminating in a tip 510 and a second handle 522 terminating in the tip 520.

Another key component of the present invention is a retaining container 600 having a sidewall 610 and a top 620 which is affixed to the container by 600 through use such as a pair of mating threaded members, press fit, etc. In the illustration since it shows that the top must be rotated one way or the other to remove the top 620 from the container 600, the members that retain the top 620 to the sidewall 610 of the rhinestone container 600 can include a mating pair of tamper proof closure members, a pair of threads on sections 610 and 620 which are threaded together and other fastening means or simply a press fit of the top 620 onto the sidewall 610. Contained within the container 600 is a selection of rhinestones 710, 720, 730, 740, 750, 760, 770, 780, 790, 800, 810 and 820. Built into the container 600 are a multiplicity of separator walls. In this case the separator walls are around the circle forming a hub which terminate in a central hub section 670. By way of example only, the rhinestones 700 can be the following colors:

Rhinestones 710—black
Rhinestones 720—purple
Rhinestones 730—pink
Rhinestones 740—pink
Rhinestones 750—yellow
Rhinestones 760—yellow
Rhinestones 770—white
Rhinestones 780—green
Rhinestones 790—red
Rhinestones 800—red
Rhinestones 810—blue
Rhinestones 820—blue It will be appreciated that these particular colors have been designed to be used in particular with the owl with the colors as previously designated but the colors can be any random selection of colors for rhinestones. Further, the use of at least one color rhinestone to correspond with at least one color of a decorative artwork and a decorative insert card is within the spirit and scope of the present invention.

With respect to the separator walls, the separator walls extend to an entire depth of the rhinestone container 600 so that one color group of rhinestones is completely separated from the next color of rhinestones. The separator walls 630 and 632 are on either sides of rhinestone 710. Separator walls 632 and 634 are on either sides of rhinestones 620. Separator walls 634 and 636 are on either sides of rhinestones 730. Separator walls 636 and 638 are on either sides of rhinestones 740. Separator walls 638 and 640 are on either sides of rhinestones 750. Separator walls 640 and 642 are on either sides of rhinestones 760. Separator walls 642 and 644 are on either sides of rhinestones 770. Separator walls 644 and 646 are on either sides of rhinestones 780. Separator walls 646 and 648 are on either sides of rhinestones 790. Separator walls 648 and 650 are on either sides of rhinestones 800. Separator walls 650 and 652 are on either sides of rhinestones 810. Separator walls 652 and 654 are on either sides of rhinestones 820. Each separator wall extends from the central hub 670 to the interior side wall 680 of the rhinestone container 600.

Figure 5:
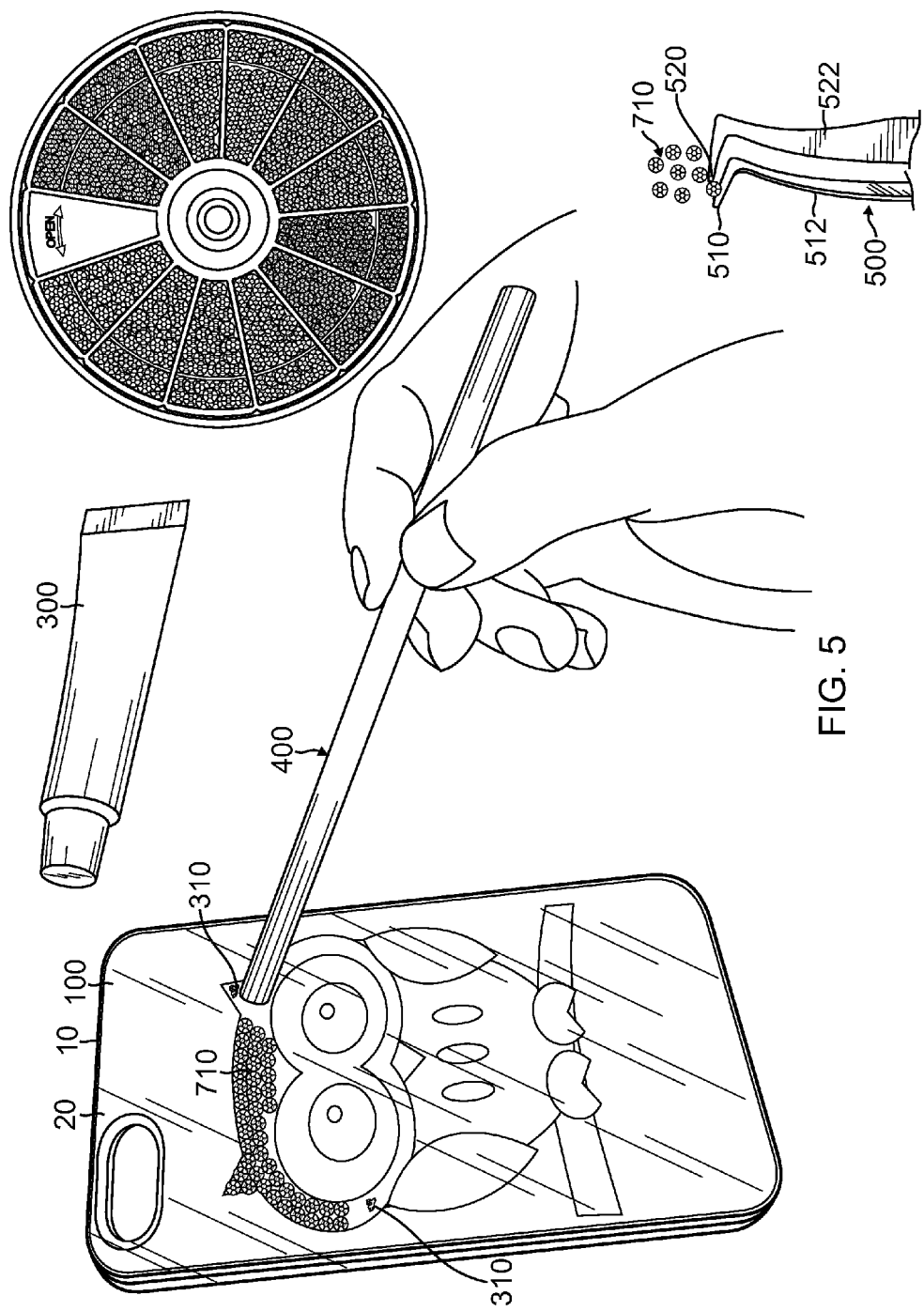
FIG. 5 is a perspective view illustrating the decorative insert placed within the cell phone protector case and a rhinestone picking pencil which encircles the rhinestone and places it onto the exterior of the cell phone protector case in alignment with a specific portion of the decorative insert.

Referring to FIG. 5, the entire kit is shown in operation. Specifically, the tweezers 520 are used to pick out a selected color of rhinestone such as red which is numbered 710 and then adhesive 310 from the adhesive container is placed over the area where the rhinestones are to be affixed. In FIG. 5, the insert card 100 has already been inserted into the cell phone protector case 10 as already explained and the decorative artwork or image 200 on the insert card 100 is visible through the transparent back surface 20 of the cell phone protector case 10 so that the decorative artwork or image 200 which in this case is the owl is visible through the transparent back wall 20 and its transparent interior surface 20I and all the colors of the owl as previously discussed are visible through the back wall 20 and its interior surface 20I. After the adhesive has been applied to the location where the rhinestones are to be affixed, and the specific rhinestone color which in this case is 710 red has been removed from the container 600, the rhinestone picking pencil 400 is used to pick up a rhinestone 710 and place it at the location 210 on back wall 20 where the color red on the face of the owl appears through the transparent back wall 20 and its interior surface 20I. As shown in FIG. 5, the individual rhinestones 710 are individually placed so that the matching color of the rhinestone matches the color selected for the specific body part of the specific animal 200 which in this case is an owl. In FIG. 5 there is illustrated the beginning of the process where the rhinestones 710 which are red are applied to the location on the owls face 210 where it is colored red.

Figure 6:
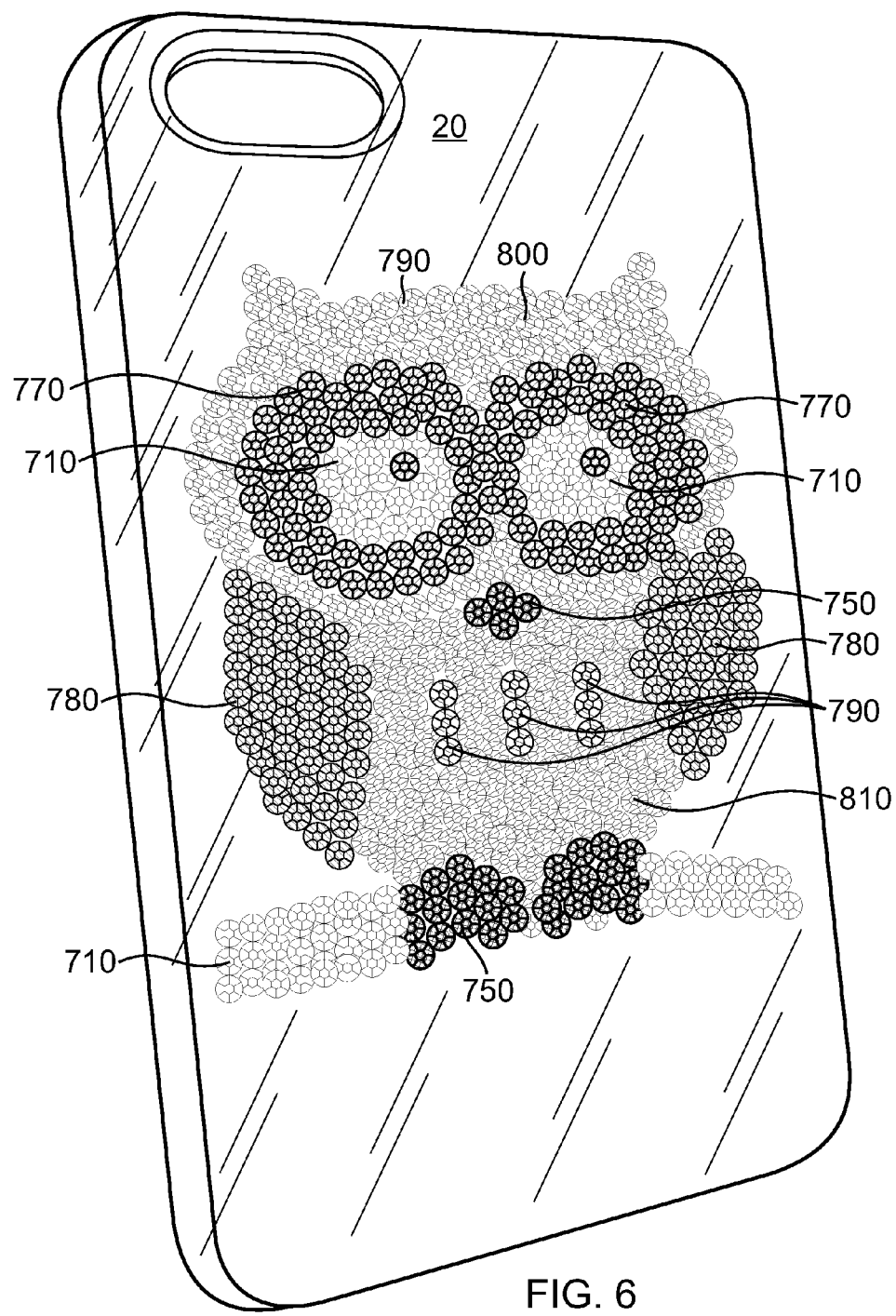
FIG. 6 is a perspective view of the completed decorative insert showing the rhinestone artwork of an owl on the back of the cell phone protector case.

This process is completed for every single color rhinestone applied to the location where the owl is a specific color and after the process is completed, the back wall 20 of the cell phone protector case 10 which is illustrated in FIG. 6 now has all the specific rhinestone colors for the specific owl as already identified affixed to the back wall 20. Therefore, the back of the cell phone protector case 20 now has the decorative owl in the colors of the owl on the insert card 100 so that the image of the owl 200 is now in rhinestones with the specific numbers of the rhinestones previously identified matching the colors on the owl as previously identified. If there is room, the insert card can be left in the cell phone protector case and then the cell phone inserted into the front and retained on the interior surfaces of the back wall, top wall, bottom wall, first sidewall and second sidewall as previously described. If there is not sufficient room, the insert card can be removed and just the cell phone itself is retained within the cell phone protector case 10.

Therefore, through the present invention, the user can decorate the back of their cell phone case with multiple rhinestones of different colors to match a color design of an animal, bird, celestial body or any other shape that is on the preselected cards. Also, the user can draw the image on a blank insert card and then have it inserted in the cell phone protector case. However, the preferred use is to have a pre-designed insert card with a specific design to be inserted into the cell phone protector case as previously described and then the rhinestones applied to the exterior of the cell phone protector case to match the colors and shape of the decorative artwork 200 on the insert card which in this case is an owl.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. An apparatus to create decorative artwork on a back wall of a cell phone protector case, comprising:
   a. a transparent cell phone protector case having a back wall with an interior surface, a top wall with an interior surface, a bottom wall with an interior surface, a first side wall with an interior surface, a second side wall with an interior surface, the entire cell phone protector case is formed in one piece;

b. a decorative insert card which contains a decorative artwork on at least one transverse surface, the decorative artwork forming an image with a multiplicity of different colors respectively depicting different portions of the decorative artwork, the decorative insert card having an upper surface, a lower surface, a first side wall, and a second side wall which form a boundary around the at least one transverse surface, the decorative insert card press fit retained against the transparent interior surface of the transparent rear wall so that the top wall of the insert card is against the interior wall of top wall of the cell phone protector case, the bottom wall of the insert card is against the interior of the bottom wall of the cell phone protector case, the first side wall of the insert card is against the interior of the first side wall of the cell phone protector case and the second side wall of the insert card is against the interior of the second side wall of the cell phone protector case so that the decorative insert is firmly affixed within the cell phone protector case and will not move;

c. a container retaining a dispensable adhesive, a rhinestone placement pencil with a placement tip, a pair of tweezers which includes a first handle terminating in a tip and a second handle terminating in the tip, a rhinestone retaining container having a sidewall and a top which is removably affixed to the container, a multiplicity of differently colored rhinestones with each respective colored rhinestone retained in separated compartments within the rhinestone retaining container; and d. a corresponding decorative image from the multiplicity of colored rhinestones is retained on the rear wall of the cell phone protector case by applying adhesive on the back wall at the location where the decorative image is visible through the back wall, the tweezer is used to remove each used colored rhinestone from the rhinestone retaining container and the rhinestone placement pencil is used to place a corresponding colored rhinestone onto the adhesive at a location where a corresponding color of the decorative artwork appears through the transparent back wall to form a cell phone protector case with a matching decorative rhinestone artwork affixed to the back wall.

2. The apparatus to create decorative artwork on the back wall of a cell phone protector case in accordance with claim 1, further comprising:

a. the inserted card is removed and a cell phone is retained in the cell phone protector case.

3. The apparatus to create a decorative artwork on the back wall of a cell phone protector case in accordance with claim 1, further comprising:

a. the decorative artwork is selected from the group consisting of a bird, an animal, a reptile, an amphibian, and a celestial body.

* * * * *